UNITED STATES PATENT OFFICE.

EDMUND NEVILLE TODD, OF NEWARK, NEW JERSEY.

VARNISH.

SPECIFICATION forming part of Letters Patent No. 384,005, dated June 5, 1888.

Application filed January 22, 1887. Serial No. 225,173. (No specimens.)

*To all whom it may concern:*

Be it known that I, EDMUND NEVILLE TODD, a citizen of the United States, residing at Newark, in the county of Essex and State of New Jersey, have invented a certain new and useful Composition of Matter to be Used as a Lacquer or Varnish and for other Purposes; and I do hereby declare the following to be a full, clear, and exact description of the invention, such as will enable others skilled in the art to which it appertains to make and use the same.

In the manufacturing of such compounds as those to which my present invention relates it is well understood that the pyroxyline or nitro-cellulose must be of the class designated as "soluble," to distinguish it from other classes which are not soluble, as my compounds are intended to be used in the manufacture of various articles formed by molding or shaping the compound in dies; or by cutting, carving, or turning it from a seasoned mass; or in solutions of pyroxyline designed to be applied to metals as lacquer; or to wood, paper, or fabrics as varnish.

It is well known that a mechanical mixture of nitro-cellulose and camphor may be made and afterward subjected to heat and pressure in closed dies, the heat liquefying the camphor and thus developing its solvent action, the camphor in such cases being termed a "latent solvent" by reason of its inaction until liquefied, whether by heat or by a menstruum. It is also well known that solutions of pyroxyline dissolved in various of the well-known solvents and mixed with various of the known menstrua can be used as a lacquer or varnish on all of the articles to which lacquers and varnishes are ordinarily applied, and that heretofore the iridescent colors caused by the irregular refraction of light shown in the lacquer when applied to metal, and the irregularity of the film caused by rapid contraction when applied to wood, paper, or fabrics as a varnish, has greatly militated against the successful use of solutions of pyroxyline designed to take the place of lacquers and varnishes heretofore used.

The object of my invention is to effect the solution or conversion of soluble nitro-cellulose by means of a latent solvent other than camphor and without necessarily employing camphor in the compounds, and also to enable solutions of pyroxyline dissolved in any of the known solvents and mixed with any of the known menstrua to be used as lacquers or varnishes, and to render them more valuable by overcoming the iridescent effect common to the one and the irregularity of film, commonly known as "creeping," in the other. To this end I have ascertained that these results may be secured in the following manner.

The soluble nitro-cellulose should be ground and dehydrated by any well-known process. The dried nitro-cellulose is then broken up into small pieces and placed in a vessel suitable to contain it. To one part, by weight, of this nitro-cellulose I add an equal quantity, by weight, of balsam of tolu, which I have discovered to be a latent solvent of nitro-cellulose, as hereinafter explained. The latent solvent being added to the pyroxyline, as above described, I subject the mass to pressure in closed dies at a temperature of about 200° Fahrenheit.

I have found that the above-specified oleo-resin or balsam operates in the same manner as camphor, in that it does not exert solvent power prematurely, and by its use I am enabled to first make a mechanical mixture and suspend the solvent action until a chemical action is desirable, and then, with the advantages of the suspension of the solvent action, as is understood, to complete the process by the application of heat and pressure, as described. Moreover, I have found that when the balsam of tolu is dissolved in any of the well-known solvents for pyroxyline—such as acetate of amyl—and the solvents are used as understood for making solutions of nitro-cellulose, and mixed with the known menstrua, to be used as lacquers or varnishes, the iridescence, as above mentioned, is entirely overcome when the solution is applied to metal, and the creeping or irregularity of film is overcome in the varnishes when applied to wood, paper, or any fabric.

It is an additional element of utility in my improvement that the use of this latent solvent is compatible with the use of all the usual solvents now employed in connection with nitro-cellulose, and it may be added to solutions of pyroxyline with an enhancement of solvent action of the liquid solvent of such solution when heated.

In some degree and for some purposes other oleo-resins—such as balsam of Peru, balsam of copaiba, &c.—are efficient and may be employed as equivalent solvents; but they are more limited in solvent power. I therefore with to claim more particularly the use of balsam of tolu, which accomplishes the desired results more quickly and perfectly.

Having thus described my invention, what I claim as new is—

The herein-described composition of matter to be used in a lacquer or varnish, consisting of pyroxyline or nitro-cellulose and balsam of tolu, in the proportions specified, substantially as and for the purposes set forth.

In testimony that I claim the foregoing I have hereunto set my hand this 19th day of January, 1887.

EDMUND NEVILLE TODD.

Witnesses:
 CHARLES H. PELL,
 WM. S. CORWIN.